United States Patent Office 3,111,627
Patented Nov. 19, 1963

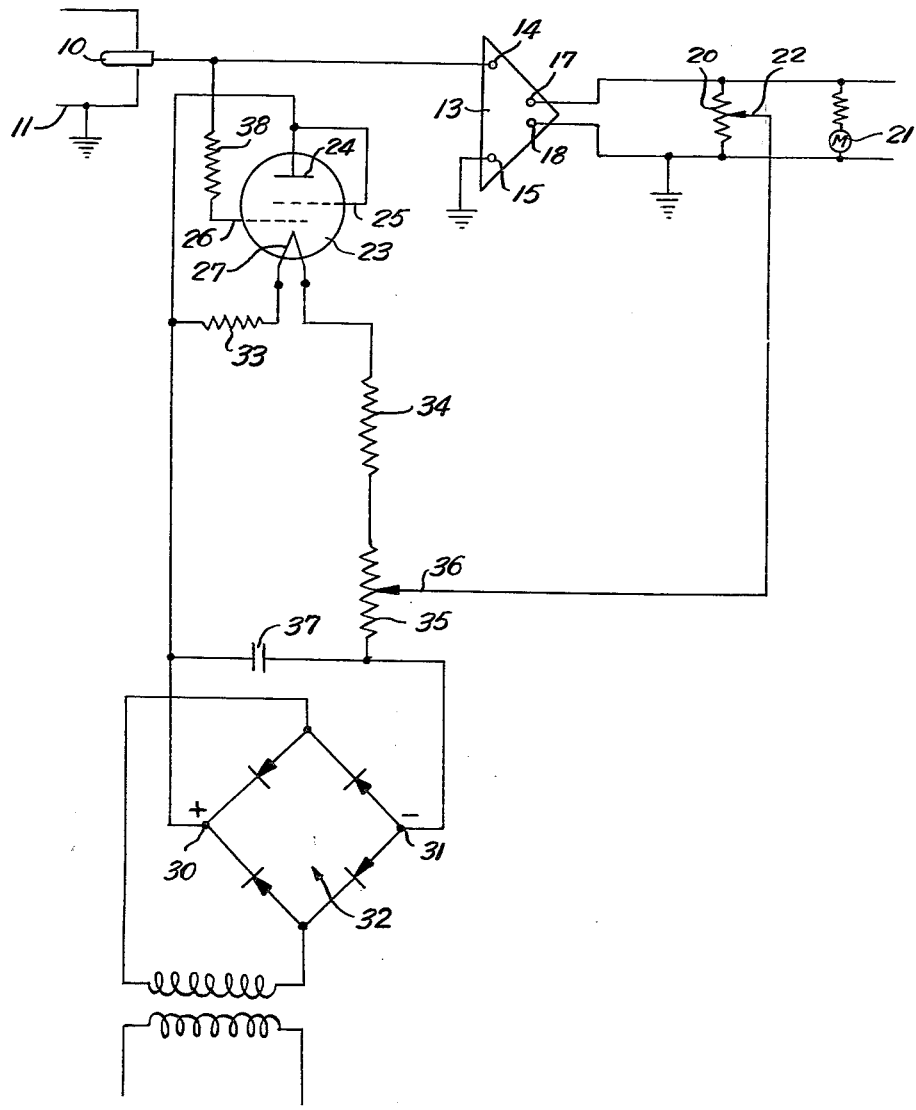

3,111,627
LOGARITHMIC CIRCUIT ELEMENT
Julius Praglin, Cleveland, Ohio, assignor to Keithley Instruments, Inc., Cleveland, Ohio
Continuation of application Ser. No. 732,708, May 2, 1958. This application Oct. 12, 1961, Ser. No. 144,726
9 Claims. (Cl. 328—145)

The present invention relates to circuits, such as micro-microammeters, utilizing a vacuum tube as a logarithmic device to provide a voltage across a pair of elements thereof which varies as the logarithm of the current between the elements. This application is a continuation of my application Serial No. 732,708, filed May 2, 1958, which application became abandoned on October 14, 1961.

Vacuum tubes have been used as logarithmic circuit devices to provide a voltage which varies as a logarithmic function of a current in the vacuum tube. Diodes are commonly used as logarithmic circuit devices but they have not proved entirely satisfactory since the commercial diodes have a relatively high leakage resistance and, furthermore, from a given group of commercial diodes it is not uncommon to find that only 10% of the diodes are satisfactory for use as logarithmic elements.

Other vacuum tubes, such as an electrometer tube having a control grid, have been utilized as logarithmic circuit devices to provide a varying voltage which is a function of the logarithm of the grid current of the tube. However, when such tubes have heretofore been connected to provide a voltage which varies as the logarithmic function of the grid current, the range of response of the tube has been seriously affected. For example, the CK–5886 electrometer tube which is outstanding when used as a logarithmic element will only have a linear response for currents in the micromicroammeter range which vary over about 4½ decades when connected in accordance with the prior art.

The principal object of the present invention is to provide a new and improved circuit in which a vacuum tube, particularly an electrometer tube in which the grid is highly insulated relative to the other electrodes, is utilized as a logarithmic diode device and is connected so as to be accurately responsive over a wider range of input currents than possible with similar vacuum tube logarithmic circuit elements of the prior art.

A further object of the present invention is to provide a new and improved circuit including a vacuum tube which functions as a logarithmic diode circuit element to provide a voltage which varies logarithmically with respect to a small input current to the tube and in which the response will be linear for currents as small as $10^{-13}$ amperes.

Another object of the present invention is to provide a new and improved circuit including a vacuum tube having a control grid and connected to develop a voltage which varies logarithmically with a small grid current in the tube and in which the plate is maintained positive with respect to the cathode and, preferably, with respect to the grid.

Further objects and advantages of the present invention will be apparent from the following detailed description of the preferred embodiment made with reference to the accompanying drawings and in which the sole FIGURE is a schematic circuit diagram of a measuring circuit including a logarithmic circuit element.

While the present invention is susceptible of use in various circuits where it is desired to produce a voltage which varies logarithmically with a small current, it is herein shown as embodied in a circuit for measuring small input currents and which has an output voltage which varies as a logarithmic function of the input current.

Referring to the drawing, the small current to be measured is applied between the input terminals 10, 11 of the measuring circuit. The measuring circuit includes a D.C. amplifier 13, preferably, an electrometer tube amplifier, having amplifier input terminals 14, 15. The amplifier 13 may be substantially the same as that shown and described in an article entitled "A New High Stability Micromicroammeter," in I.R.E. Transactions on Instrumentation, volume 1–6, No. 2, pages 144–147 (1957). The amplifier input terminal 14 is connected to the measuring circuit input terminal 10 and the other amplifier input terminal 15 is grounded, as is the other measuring circuit input terminal 11. The amplifier has output terminals 17, 18 across which a voltage dividing resistance 20 is connected as well as a series circuit including a resistance and an indicating meter 21 having a logarithmic scale.

The voltage dividing resistance 20 has a movable tap 22 and the tap 22 is connected to the input of the amplifier so that a portion of the voltage developed across the resistance 20 is degeneratively fed back to the input of the amplifier.

The feed-back loop of the amplifier includes a logarithmic vacuum tube 23, a tetrode in the illustrated embodiment having a plate 24, a screen grid 25, a control grid 26, and a filamentary cathode or filament 27. The tube 23 is preferably an electrometer tube which has the grid thereof highly insulated from the other elements of the tube. Electrometer tubes are generally defined as tubes having a grid current of $10^{-12}$ amperes or less when the tube is operated as an amplifier. Heating current for the filament 27 is supplied from a full wave rectifier 32. The filament 27 is connected to output terminals 30, 31 of the full wave rectifier 32 by a resistor 33 connecting one side of the filament to the positive terminal 30 of the rectifier, the other side of the filament being connected to the negative terminal of the rectifier by a resistance 34 and a potentiometer-type resistance 35 connected in series between the filament and the rectifier. The potentiometer-type resistance 35 has a movable tap 36 connected to the movable tap 22 of the resistance 20. A filtering condenser 37 is preferably connected across the output of the full wave rectifier.

The control grid 26 of the tetrode is connected to the measuring circuit input terminal 10 by a resistor 38. The grid 26 functions as the anode of the tube and an input current applied to the terminal 10 will cause a current to flow between the control grid, functioning as an anode, and the cathode or filament 27. For extremely small input currents, for example, input currents of the order of magnitude of $10^{-10}$ amperes, the grid-cathode voltage will vary logarithmically with respect to the input current over a range of decades depending on the tube utilized. The input voltage to the amplifier 13 and, in turn, the output thereof varies in accordance with the grid-to-cathode voltage of the tube 23, and, therefore, varies logarithmically with the input current to the measuring circuit.

It has been discovered that the range of logarithmic response of the tube 23 is increased if the plate 24, and the screen grid when a tetrode is used as in the illustrated embodiment, is maintained positive with respect to the filament and preferably with respect to the control grid. For example, it has been found that when a CK–5886 tube is connected as a tetrode in the manner described, the tube performs very satisfactorily if the plate is about 1.5 to 3.0 volts positive with respective to the filament. The plate 24 is connected to the positive terminal 30 of the rectifier and the resistor 33 is chosen so as to provide a desired voltage drop between the plate and the filament.

The screen grid 25 is connected to the plate so as to be maintained at the same potential as the plate.

The operation of the measuring circuit has not been described in detail since the present invention relates to the manner of obtaining a voltage which varies logarithmically with respect to a small current. Suffice it to say that in the illustrated embodiment the input current is established between the terminals 10, 11 and flows in the control grid-filament circuit of the tube 23 to provide a voltage at the input terminals of the amplifier 13 which varies logarithmically with the input current. The grid 26 is biased by the voltage developed across the resistor 34 and the part of the resistance of potentiometer resistance 35 which is on the positive side of the tap 36. The biasing voltage bucks the input current applied to the terminals 10, 11. The grid-cathode circuit may be traced from the input terminals 10 and 11 through the resistor 38, the grid 26, the cathode 27, the resistor 34, the upper portion of the resistance 35, the tap 36, the tap 22, the lower portion of the resistance 20 and the ground connections back to the terminal 11.

In addition to the biasing voltage, a portion of the output voltage is fed back by the connection between the tap 22 and the tap 36 and also bucks the input current flowing in the control grid-cathode circuit of the tube 23.

While the logarithmic device has been described as connected in the feed-back loop of the amplifier 13, it may be connected in shunt with the input of the amplifier and, as mentioned above, it may be utilized in other circuits where it is desirable to obtain a voltage which varies as the logarithm of a small input current.

In the preferred embodiment of the present invention, the vacuum tube shown is a tetrode and the screen grid of the tetrode is connected to the plate and maintained at the same potential to the plate. It will be understood that other tubes having at least a plate, control grid, and cahode, preferably a directly heated cathode, may be utilized as a logarithmic diode with the plate maintained positive with respect to the cathode and preferably the control grid as well and operated as a passive circuit element which is independent of circuits into which the elements of the tube forming the logarithmic diode are connected.

It can now be seen that the present invention provides a new and improved circuit wherein a vacuum tube is used as a diode to provide a voltage which varies logarithmically with respect to a current between elements of the tube, the tube having a cathode, control grid, and plate, with the control grid and cathode constituting the principal electrodes of the tube when connected into the circuit, the plate being connected into the circuit as an auxiliary electrode, i.e., as a passive circuit element, and is maintained positive with respect to the cathode and preferably the grid as well. The improved circuitry extends the range of responsive of the vacuum tube and enables the circuit to be used over a wider range of current.

While the preferred embodiment of the present invention has been described in considerable detail, further constructions, arrangements, and modifications will appear to those skilled in the art, and it is hereby my intention to cover all such constructions, arrangements, and modifications which fall within the spirit and scope of the present invention.

Having described my invention, what I claim is:

1. In an electrical circuit for providing a voltage which varies logarithmically with variations of a small current and including a vacuum tube functioning as a nonlinear circuit element and having a plate, a grid, and a cathode, input circuit means connected to the grid-cathode path of said tube to establish a variable grid current from the grid to the cathode, whereby said grid and cathode act as a logarithmic diode in which the voltage between said grid and cathode varies as a logarithmic function of said current between said grid and cathode, output circuit means connected between said grid and cathode and responsive to the grid-to-cathode voltage, and biasing circuit means connecting said plate and cathode and biasing said plate by directly connecting said plate to a substantially fixed potential which is positive with respect to said cathode, said output circuit means being connected independently of said plate, said plate functioning as a passive circuit element.

2. In an electrical circuit, the combination as defined in claim 1, wherein said biasing circuit means biases said plate about 1.5 to about 3 volts positive with respect to said cathode.

3. In an electrical circuit for providing a voltage which varies logarithmically with variations of a small current and including a vacuum tube functioning as a nonlinear circuit element and having a plate, a grid, and a directly heated cathode, input circuit means conducting said small current to the grid-cathode path of said tube to establish a current between the grid and cathode, said grid and cathode defining a logarithmic diode with the grid-cathode voltage varying logarithmically with the grid current from said grid to said cathode, a direct current power supply for heating said cathode, output circuit means connected between said grid and cathode for energization in accordance with said grid-cathode voltage, an impedance connecting the positive side of the power supply to said cathode, and means directly connecting said plate to the positive side of said impedance so that the potential applied to the plate has a substantially fixed value, said output circuit means being connected independently of said plate whereby said plate functions as a passive circuit element.

4. In an electrical circuit for providing a voltage which varies logarithmically with variations of a small current including a vacuum tube functioning as a nonlinear circuit element and having a plate, a screen grid, a control grid, and a directly heated filament constituting the cathode thereof, input circuit means connected to the grid-cathode path of said tube to establish a grid current from grid to said cathode, said grid and cathode defining a logarithmic diode with the grid-cathode voltage varying logarithmically with the grid current, said plate and screen grid being passive circuit elements, voltage-responsive measuring means connected between said grid and cathode independently of said plate and responsive to the grid-cathode voltage, biasing circuit means directly connected to said plate and filament and biasing said plate with a substantially fixed potential which is positive with respect to said control grid and said cathode, and means directly connecting said screen grid to said plate to maintain said screen grid at the same potential as said plate.

5. In an electrical circuit, the combination as defined in claim 4 wherein said biasing circuit means biases said plate substantially in the range of about 1.5 to about 3 volts positive with respect to said cathode.

6. In an electrical circuit for providing a voltage which varies logarithmically with variations of a small current and including an electrometer tube functioning as a nonlinear circuit element and having a plate, control grid, and a filamentary cathode with the grid and cathode connected into said circuit to provide a logarithmic diode with said plate functioning as a passive circuit element, said small current being the grid current of said tube, biasing means directly connected to said plate to maintain said plate at a substantially fixed potential which is positive with respect to said cathode in the range of from about 1.5 volts to about 3 volts positive with respect to said cathode.

7. In an electrical circuit for providing a voltage which varies logarithmically with variations of a small current, an electrometer tube functioning as a nonlinear circuit element having a plate, a grid, and a directly heated cathode, input circuit means conducting a small current to the grid-cathode path of said tube to establish a grid current from the grid to the cathode with the grid-to-cathode voltage varying logarithmically, voltage-responsive output circuit means connected between said grid and cathode, a direct current power supply for heating said cathode, an impedance connecting the positive side of said power supply to said cathode, and means directly connecting said plate to the positive side of said impedance so that the potential applied to the plate has a substantially fixed value, said plate being about 1.5 volts to 3 volts positive with respect to said cathode, said input circuit means and said output circuit means being connected independently of said plate whereby said plate is a passive circuit element.

8. The method of operating a vacuum tube device having a plate, control grid and cathode as a logarithmic diode which comprises establishing a small current to be measured between the grid and cathode of the tube to cause the grid-to-cathode voltage to vary logarithmically with the small current, and using the plate of the tube as a passive circuit element which is independent of the circuit into which the tube is connected as a nonlinear circuit element and biasing said plate positive by about 1.5 to 3 volts with respect to said cathode.

9. In an electrical circuit for measuring a small current, a voltage responsive amplifier having input terminals, an output circuit and a feedback circuit connected between the input terminals and the output circuit, said feedback circuit including a vacuum tube functioning as a nonlinear circuit element and having a plate, a grid, and a cathode, the grid-cathode path of said tube being connected in series in said feedback circuit to establish a variable grid current from the grid to the cathode, said grid and cathode acting as a logarithmic diode in which the voltage between said grid and cathode varies as a logarithmic function of said grid current, and biasing circuit means connected directly to said plate and biasing said plate with a substantially fixed potential which is positive with respect to said cathode, said feedback circuit being connected independently of said plate whereby said plate functions as a passive circuit element.

References Cited in the file of this patent

UNITED STATES PATENTS

| | | |
|---|---|---|
| 2,861,182 | Green | Nov. 18, 1958 |
| 3,058,057 | Frost | Oct. 9, 1962 |

FOREIGN PATENTS

| | | |
|---|---|---|
| 936,997 | Germany | Dec. 1, 1955 |